(12) United States Patent
Schmitz et al.

(10) Patent No.: US 6,205,704 B1
(45) Date of Patent: Mar. 27, 2001

(54) METHOD AND APPARATUS FOR ENHANCING PLANT GROWTH IN GREENHOUSES UTILIZING LANDFILL GAS

(75) Inventors: Richard C. Schmitz, New Canaan, CT (US); Cris Lombardi, Lakehurst; Andre A. Simone, Denville, both of NJ (US)

(73) Assignee: William C. Crutcher, Middlebury, CT (US)

( * ) Notice: Subject to any disclaimer, the term of this patent is extended or adjusted under 35 U.S.C. 154(b) by 0 days.

(21) Appl. No.: 09/264,458

(22) Filed: Mar. 8, 1999

Related U.S. Application Data
(60) Provisional application No. 60/077,233, filed on Mar. 9, 1998.

(51) Int. Cl.[7] .............................. A01G 9/24; A01G 9/18; A01G 7/02
(52) U.S. Cl. .................................................. 47/17; 47/58.1
(58) Field of Search ........................................ 47/17, 58.1

(56) References Cited

U.S. PATENT DOCUMENTS

| 4,784,672 | * | 11/1988 | Sircar ........................................ 55/26 |
| 4,957,721 | * | 9/1990 | Lonsinger et al. .................... 423/461 |
| 5,059,405 | | 10/1991 | Watson et al. ........................ 423/210 |
| 5,124,292 | * | 6/1992 | Larson et al. ........................... 502/38 |
| 5,451,249 | | 9/1995 | Spiegel et al. ......................... 95/117 |
| 5,632,798 | * | 5/1997 | Funk et al. .................................. 71/9 |
| 5,642,630 | * | 7/1997 | Abdelmalek et al. .................. 62/632 |
| 5,681,360 | * | 10/1997 | Siwajek et al. ...................... 48/127.3 |
| 5,695,641 | * | 12/1997 | Cosulich et al. ...................... 210/603 |
| 5,727,903 | * | 3/1998 | Borray et al. ......................... 405/129 |
| 5,842,357 | * | 12/1998 | Swiwajek et al. ...................... 62/625 |

FOREIGN PATENT DOCUMENTS

| 2 124 608 | * | 2/1984 | (GB) . |
| 03236724 | * | 10/1991 | (JP) . |
| 0928936 | * | 11/1997 | (JP) . |

OTHER PUBLICATIONS

Article obtained from Internet entitled "Voluntary Pollution Prevention at a Profit" by the US EPA Landfill Methane Outreach Program, undated.

* cited by examiner

Primary Examiner—Michael J. Carone
Assistant Examiner—Jeff Gellner
(74) Attorney, Agent, or Firm—William C. Crutcher

(57) ABSTRACT

An environmentally controlled greenhouse is located near a landfill site and uses the landfill gas to both heat the greenhouse and furnish a clean carbon dioxide enriched product gas to enhance plant growth. The clean $CO_2$ system product gas is used to regenerate adsorber beds which remove undesirable constituents from the landfill gas. A portion of the landfill gas may also power an extraction steam turbine which heats the greenhouse with extraction steam. The system is controlled to enhance plant growth by adjusting the temperature and $CO_2$ levels.

9 Claims, 2 Drawing Sheets

Figure 1:
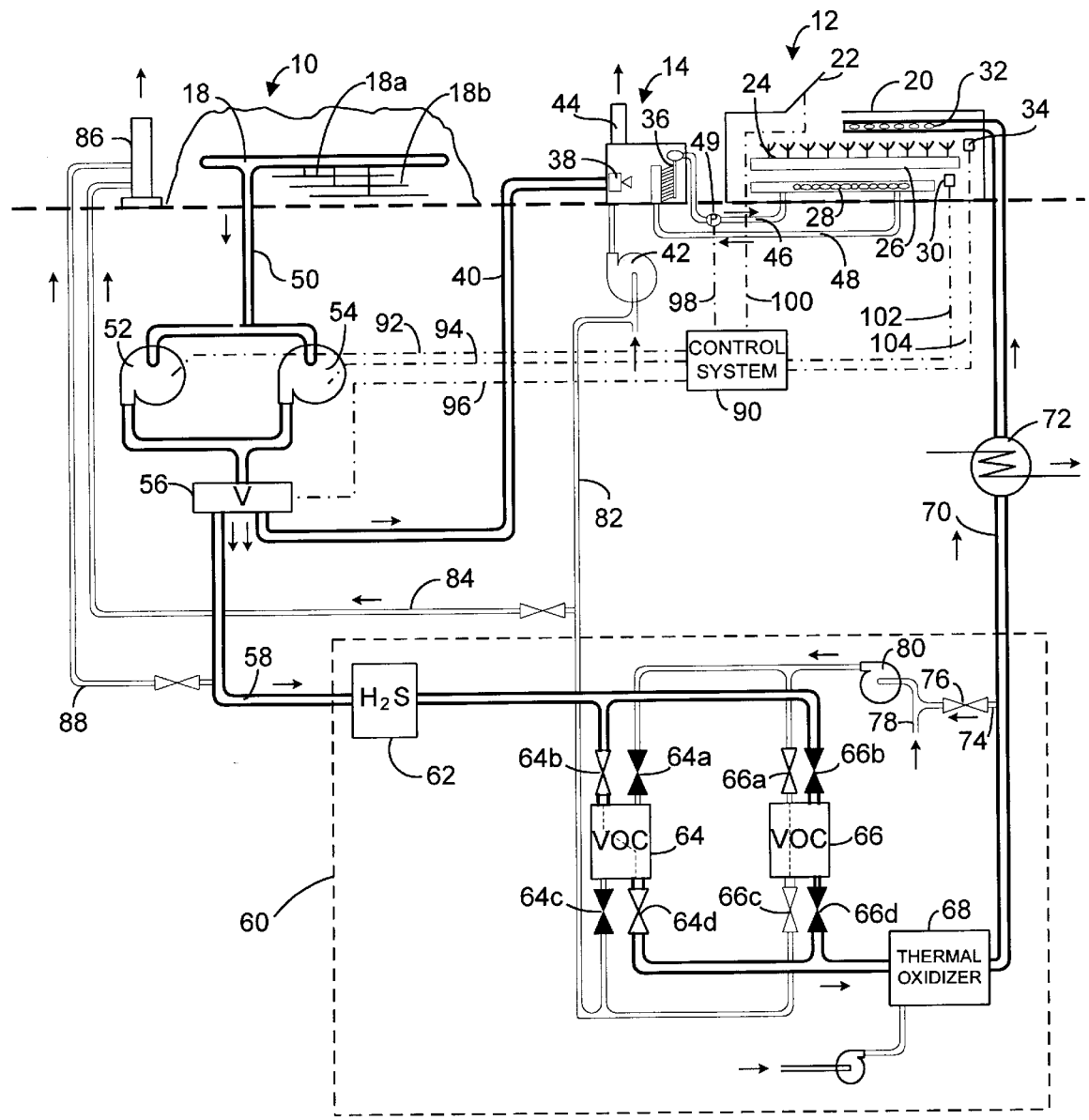

METHOD AND APPARATUS FOR ENHANCING PLANT GROWTH IN GREENHOUSES UTILIZING LANDFILL GAS

CROSS REFERENCE TO RELATED APPLICATIONS

This application claims the benefit of prior filed co-pending provisional application Ser. No. 60/077,233 filed Mar. 9, 1998.

BACKGROUND OF THE INVENTION

This invention relates generally to a method and apparatus for enhancement of artificially cultured agricultural products within an environmentally controlled greenhouse environment. More particularly, the invention relates to utilization of waste gas from a landfill to provide enhanced crop growth within a greenhouse in an environmentally safe and controlled system.

Yields from food crops and lengthening of the growing season can be achieved by growing the crops under environmentally controlled conditions in large greenhouses. For example, yields of tomatoes grown in a hydroponic greenhouse with a computer controlled growing environment may be many times higher than the yield of tomatoes grown outdoors which are subject to a shorter growing season and uncontrolled environment. Such a greenhouse is described in an article in the Business section of *The Dallas Morning News* dated Sunday, Jan. 12, 1997 entitled "High-Tech Tomatoes". The tomatoes are grown in a hydroponic system, supported not in soil but in a porous artificial "rock wool" made from volcanic material. Correct amounts of water and nutrients are supplied to the plants and the plants are kept warm by a circulating hot water system heated by burning natural gas (methane). Controlled amounts of exhaust gas from the burners containing carbon dioxide ($CO_2$) is recycled back into the greenhouse.

It is well known that carbon dioxide ($CO_2$) is an essential ingredient of the process of photosynthesis, and will enhance plant growth.

Photosynthesis is a metabolic process, occurring in green plants, and characterized by the utilization of light (usually sunlight) to convert carbon dioxide and water into carbohydrates and oxygen. The chemical formula for the photosynthetic reaction is:

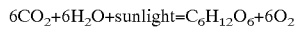

$$6CO_2 + 6H_2O + \text{sunlight} = C_6H_{12}O_6 + 6O_2$$

Most green plants of the Temperate Zone photosynthesize at temperatures between 10° C. and 35° C. (50° F.–95° F.). The most important external factors are: intensity and duration of light; concentration of available carbon dioxide; temperature; and water supply. Sunlight of great intensity and long duration increases the amount of photosynthesis performed. About 0.03 of one percent of the total volume of the atmosphere is made up of carbon dioxide; hence, one of the limiting factors on the extent of photosynthesis is the amount of available carbon dioxide.

When plants are artificially cultured these external factors can sometimes be controlled. While artificial cultivation of crops in a controlled greenhouse 20 environment increases the yield, it is also a more expensive process because of the requirement to burn natural gas or other fuel to warm the crops and also to enhance the ambient $CO_2$ levels in the greenhouse which can be accomplished by injection of expensive purchased $CO_2$, or, utilization and injection of the $CO_2$ rich flue gas from the combustion of the natural gas fired heat generators. On the other hand, a potential energy source is available from municipal solid waste landfills, which are generally conceded to be an environmental liability and source of atmospheric pollution.

Each person in the United States generates about 4.5 pounds of waste per day, or almost one ton per year, most of which is deposited in municipal solid waste landfills. As this land filled waste decomposes, it produces landfill gas. Uncollected landfill gas contributes to the formation of smog and poses an explosion hazard if uncontrolled. Collected and controlled landfill gas is a viable source of energy. Landfill gas is typically a medium Btu gas that has a number of energy applications. The most prevalent use is production of electricity for sale to a local utility via turbines or engines. Other options include direct use of the gas as boiler fuel, production of compressed natural gas for vehicle fuel, or upgrade to pipeline quality gas.

On the negative side, landfill gas is harmful to the environment because it is primarily made up of so-called "greenhouse gases" which contribute to global warming. The "greenhouse gases" capture heat from the sun-warmed earth, which would otherwise be rechanneled back into space, contributing to the so-called "greenhouse effect". The "greenhouse gases" are carbon dioxide, methane, nitrogen oxide, chlorofluorocarbons and ozone. Landfill gas typically contains 30%–55% methane and 25%–45% carbon dioxide and trace amounts of non-methane hydrocarbons (NMO), chloro-hydrocarbons, and reduced sulphur compounds (TRS)/($H_2S$).

Regulations already require many landfills to collect their landfill gas emissions. Once the gas is collected, landfill owner/operators have two choices: (1) flare the gas; or (2) produce energy for sale or on-site use. Both options address local air quality and safety concerns, but only energy recovery capitalizes on the energy value of landfill gas and displaces the use of fossil fuels.

Various proposals have been made for utilization of landfill gas. A process for producing essentially pure carbon dioxide from landfill gas is described in U.S. Pat. No. 5,059,405 issued Oct. 22, 1991 to Watson et al. This patent describes a process and apparatus for removing the impurities from a gas stream produced from a landfill such that essentially pure carbon dioxide and methane is recovered. After the landfill gas is mechanically dewatered, the gas is filtered of particulate solids and aerosols and purified by removing sulfur compounds using zinc oxide columns, removing halogens using activated alumina columns, removing hydrocarbons using activated charcoal columns, and oxidizing remaining impurities using potassium permanganate impregnated activated alumina columns. Lastly the gas is incinerated in a boiler/incinerator combustion furnace to produce an exit stream containing essentially pure carbon dioxide and air, which is further treated in a conventional carbon dioxide treatment process.

The $CO_2$ stream resulting from the process is compressed for storage in a liquified condition in a storage tank. According to the patent, the starting landfill gas stream typically contains 40%–60% $CH_4$, 30%–45% $CO_2$, 1%–3% $O_2$, 3% to 10% $N_2$, by volume and various trace impurities.

Another process for utilizing landfill gas is described in U.S. Pat. No. 5,451,249 issued Sep. 19, 1995 to Spiegel et al. The gas stream which emanates from landfills is treated to produce a purified gas which is essentially a 20 hydrocarbon such as methane which can be used as the fuel source in a fuel cell power plant, or can be used in other power plants which use natural gas as a fuel. The landfill gas passes through a system which removed essentially all of the hydrogen sulfide; water; organic sulfur and halogen compounds; and solid contaminants from the gas stream. The resultant purified gas stream can be cleanly flared; used to power an energy plant; or put to other useful purposes. The resulting fuel is used in a fuel cell operated on landfill gas at a landfill site.

Where landfill gas is emitted into the atmosphere without recovery and use, the carbon dioxide and methane have a global warming potential. Furthermore some of the non-methane constituents of landfill gas such as hydrogen sulfide ($H_2S$), are odoriferous and also potentially harmful to the environment. In the fuel cell process, moisture and volatile organic compounds (VOCs) including sulfides and halogenated compounds are removed. Dual clean up trains are employed in parallel absobers, so that when one train is in service cleaning the gas, the other is being regenerated with a portion of the cleaned gas.

In the foregoing patented systems, the total flow stream of landfill gas is processed, either to produce pure $CO_2$ for industrial purposes, or to produce a purified hydrocarbon gas to be used as a fuel source in a fuel cell or power plant.

It would be desirable to integrate the needs of an environmentally controlled greenhouse for growing plants so as to utilize the environmentally damaging landfill gas emanating from a municipal solid waste landfill in a manner which is both economically beneficial and environmentally safe, so as to increase the yield of growing plants while reducing the emission of potentially polluting gas to the atmosphere.

Accordingly, the primary object of the invention is to provide an improved method and apparatus for utilizing landfill gas to enhance plant growth in a greenhouse.

SUMMARY OF THE INVENTION

Briefly stated the invention comprises a method and apparatus for an environmentally controlled greenhouse located near a landfill site, comprising collecting landfill gas (LFG) from the landfill, transporting the landfill gas, distributing a first LFG portion of the landfill gas to a combustion system, heating a heat exchange fluid with the products of combustion, and controlling the temperature of growing plants in the greenhouse with the heat exchange fluid, distributing a second LFG portion of the landfill gas to a $CO_2$ system, where the non-methane hydrocarbons (NMO) and reduced sulphur compounds (TRS) are adsorbed from the LFG prior to a controlled combustion which removes methane and generates a clean $CO_2$ system product gas (CSPG), conducting the CSPG to the greenhouse enclosure, and selectively controlling the temperature and the carbon dioxide level in the greenhouse. In a preferred embodiment, a portion of the $CO_2$ system product is mixed with air and used to regenerate dual-connected adsorber beds used to remove the NMO's from the second LFG portion. A modified system interposes a turbine generator to recover additional energy from the combustion of the first LFG portion and uses steam extracted from the turbine to heat the greenhouse.

DRAWING

Figure 2:
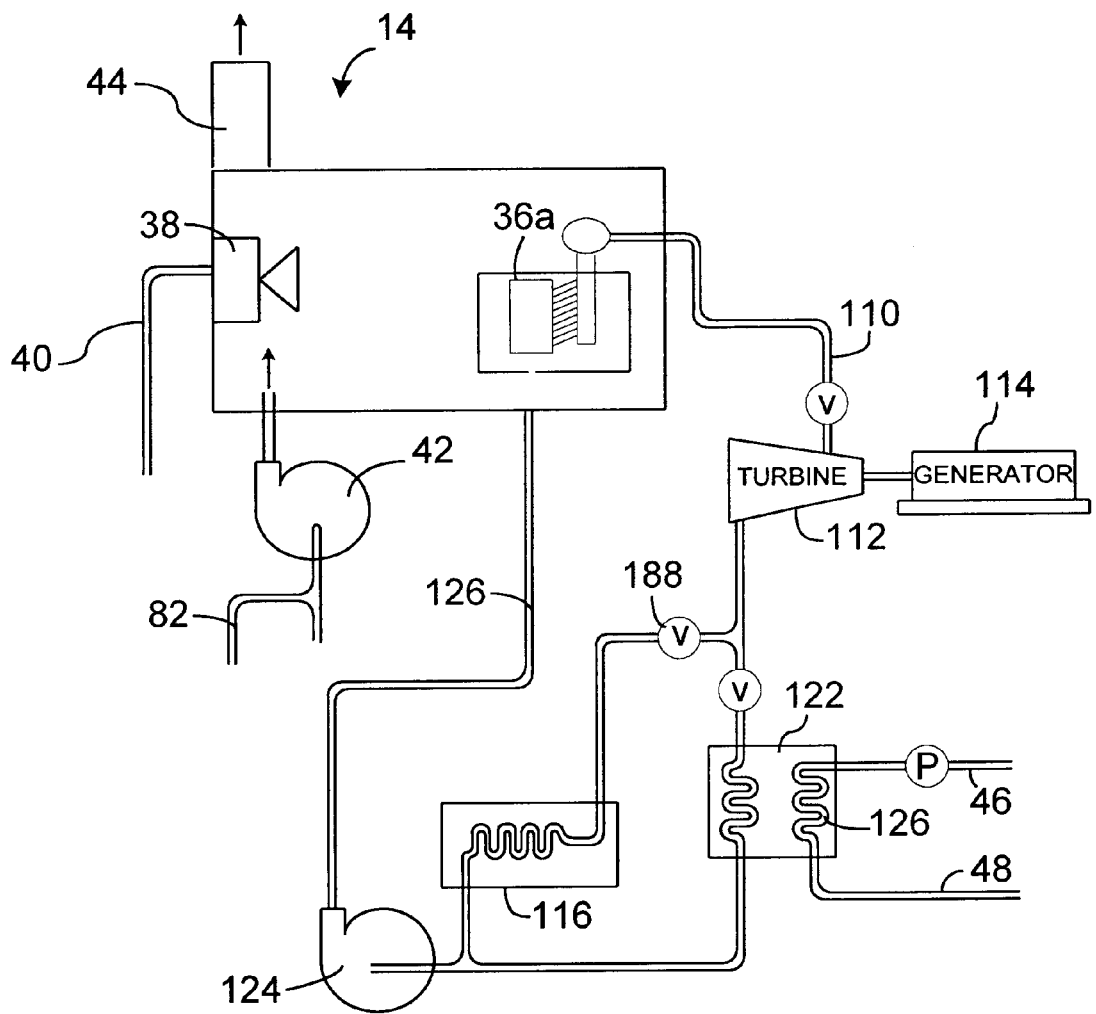

FIG. 1 is a simplified schematic drawing of the landfill and greenhouse system, and FIG. 2 is a schematic drawing of portions of a modified system.

DESCRIPTION OF THE PREFERRED EMBODIMENT

Referring now to FIG. 1 of the drawing, a municipal solid waste landfill 10 is located near an environmentally controlled greenhouse 12, the latter being serviced by one or more heating systems 14. Landfill 10 typically will have enough LFG generation to meet the peak winter thermal load of the greenhouse, and includes a landfill gas collection header 18 supplied by lateral collection feed lines 18a, 18b etc. distributed throughout the landfill.

Greenhouse 12 is a completely enclosed structure with special glass panes 20 to admit the sunlight and air via electrically controlled vents 22. Food crop plants 24, such as tomatoes, are arranged in hydroponic trays 26 carrying water, nutrients and having frames supporting the plants in rock wool. The greenhouse temperature is maintained by means of a heat exchanger 28 supplied by a hot water circulation system. Temperature sensors 30 detect the temperature of both the hot water piping and the ambient temperature in the greenhouse.

An injection system 32 is supplied by means of a $CO_2$ system to be described, and the $CO_2$ level inside greenhouse 12 is sensed and measured by a $CO_2$ sensor 34. The heating system 14 includes one or more steam or hot water boilers 36 heated by a combustion burner 38, utilizing fuel supplied through a line 40 and supplied with combustion air by a blower 42. The waste combustion products are emitted through stack(s) 44. Boiler 36 supplies heat exchange fluid, hot water in this case, via supply line 46 to greenhouse heat exchanger 28 and then to return line 48. A pump 49 circulates the heated water to regulate the temperature in response to appropriate control signals.

Referring now to the collection and distribution of landfill gas (LFG), gas from the header 18 is conducted through a low pressure supply line 50 to a pair of gas compressors 52, 54 which compress the LFG to a pressure as may be required to transport the LFG to the greenhouse site and provide the pressure at the boiler plant as may be required for proper burner operation—typically 3–20 psig. From the compressors 52, 54, the LFG flows to an electronically controlled flow distribution valve 56. A first portion of LFG exits distribution valve 56 to the fuel line 40 supplying burner 38 in the boiler power plant 14. A second portion of the LFG exits the distribution valve 56 to a line 58 which supplies a carbon dioxide system shown within the box indicated by dashed line 60.

$CO_2$ system 60 includes an adsorption filter 62, consisting of activated carbon with a replaceable insert for removing hydrogen sulfide ($H_2S$), a pair of parallel-connected adsorbers 64, 66 to absorb halogen and long chain hydrocarbons, and a thermal oxidizer (or controlled combustion system) 68 for removal of residual combustible hydrocarbons. The treated $CO_2$ system product gas (CSPG) exits $CO_2$ system 60 via a line 70, is cooled in a heat exchanger 72 and conducted to the previously mentioned $CO_2$ distribution line 32 inside the greenhouse.

The details of the $CO_2$ system 60 may vary according to the make up of the landfill gas and according to the degree of $CO_2$ treatment desired. The landfill gas typically contains 30–55% methane, 20–45% carbon dioxide, and the balance of other gases, some of which are harmful to plant growth. The $CO_2$ system 60 is designed to provide $CO_2$ system product gas (CSPG) which is enriched with $CO_2$ to enhance plant growth, and from which the methane and other gases harmful to plant growth have been removed.

In the system shown in FIG. 1, the parallel connected adsorbers 64, 66 are regenerated in alternate cycles by the system described as follows. Regenerating gas as required is drawn from CSPG line 70 through regenerator supply line 74, as controlled by valve 76, mixed with ambient air entering at 78 and transported via fan 80. Adsorber 66 has admission valves 66a, 66b, exit valves 66c, 66d. Similarly adsorber 64 has valves 64a–64d. When the valves are in the position shown in the drawing, with valves 64a, 64c, 66b, 66d closed, and valves 64b, 64d, 66a, 66c open, the regenerating gas, which is primarily air, flows through adsorber 66 to regenerate the adsorber. The regenerating gas exits via a line 82, whence it joins with combustion air supplying burner 38. Alternatively, the spent regenerating gas may be drawn off through a line 84 to support combustion in an on-site flare 86. The flare combustion fuel is LFG supplied to flare 86 via a line 88 connected to the compressed LFG supply line 58.

While adsorber 66 is being regenerated, the primary flow of the second LFG portion from the distribution valve 56 is flowing through adsorber 64 where most of the non-methane hydrocarbons (NMO) are removed. The residual hydrocarbon is oxidized in thermal oxidizer 68.

Lastly, a control system 90 is illustrated which provides output signals over lines 92, 94 to increase or decrease the total LFG flow, and over a control line 96 to distribution valve 56 to vary the distribution of LFG between the burner 38 in the boiler plant 14 and the carbon dioxide system 60 supplying CSPG to the greenhouse. Control system 90 controls the heat energy supplied to the plants via a control signal line 98 connected to the heat exchange pump 49 and also controls the ventilation and air temperature of the greenhouse through a control signal line 100 to the electrically controlled ventilation flaps. Inputs to the control system 90 include a temperature signal over line 102 from the temperature sensor 30 and $CO_2$ level signal over a line 104 from the $CO_2$ sensor 34. Many other input signals may be provided to control system 90 to monitor the environmental conditions in the greenhouse, the status of the $CO_2$ system and the LFG supply, the sensors shown being only exemplary.

Referring to FIG. 2 of the drawing, a modified system interposes a turbine/generator to produce electricity and utilize energy present in any excess landfill gas not needed in the greenhouse plant growth process. FIG. 2 omits the parts of the FIG. 1 system which are the same as previously described and repeats the same reference numbers when the elements are identical to those in FIG. 1.

Instead of generating hot water in heating plant 14, a steam generator 36a is fired by the combustion burner 38 to generate steam, using a first LFG portion of the landfill gas. The second LFG portion is treated in the $CO_2$ system and supplied to the greenhouse as before.

Steam from steam boiler 36a is conducted via line 110 to steam turbine 112 coupled to generator 114. Exhaust steam is lead to an air-cooled condenser 116 through a control valve 118. A part of the exhaust steam from turbine 112 is extracted through an extraction control valve 120 and fed through a steam-hot water heat exchanger 122 to join with condensate from condenser 116. The condensate is returned to steam generator 36a by pump 124 via condensate return line 126.

Extraction steam flowing through heat exchanger 122 is passed in heat exchange relationship with a hot water heating coil 126. This is fed by line 48 and used to supply the greenhouse hot water heating line 46 as before.

OPERATION

The system is operated so as to maximize the growing cycle of plants in the greenhouse and to minimize the emissions of harmful gas to the atmosphere during conditions of favorable growth, i.e., in the sunlight during the daytime (or alternatively under artificial lighting at night). The $CO_2$ level in the greenhouse is controlled to be as high as possible but not to exceed 1,000 ppm for safety reasons. However, it is recognized that some plants, such as tomatoes, require resting periods when photosynthesis is not taking place and at such times, the generation of carbon dioxide is not required. Typically at such times, which are during night time, or on sunless days, the ambient temperature is cooler and more heat is required from the boiler system to keep the plants warm.

By suitable operation of the control system 90, the flow rate of LFG supplied to the overall system and the distribution of LFG between that used to heat the plants and that used to supply CSPG to the plants can be operated to achieve the most economical operation.

The regeneration of the adsorbers takes place in the following manner. The landfill gas (LFG) to the $CO_2$ system 60 is processed prior to the thermal oxidizer 68. The reduced sulfur compounds (TRS) are adsorbed in replaceable reactors 62. The non-methane hydrocarbons (NMO) are adsorbed over the period of operation of the $CO_2$ system— typically 8–10 hours during daylight hours. There will be two trains of NMO adsorption—one train in operation for $CO_2$ generation with the second train being regenerated. The regeneration medium will be essentially air entering at 78. The regeneration cycle will be approximately 8 hours, the initial 1–2 hours for heat-up (to 500–600° F.), the third and fourth hours for driving off the adsorbed NMOs, the last four hours for cooling with unheated air. It is anticipated that the regenerated gas will not have any NMO during the first and last four hours of the cycle. The average NMO (VOC) emissions over the 8 hour cycle will be about the same as for the hot water boilers. The regenerating gas (essentially air) will normally be routed to the inlet air of operating hot water boiler plant 14. It is anticipated that the boilers will be in operation during the day for 7–8 months. For the late spring and summer months (May through September) this regenerating gas will be re-routed to the on-site enclosed type combustor/flare 86.

EXEMPLARY SYSTEM

A system comprising a 20 acre hydroponic greenhouse, consisting of two ten-acre glass greenhouse banks connected by a packing house is proposed near a landfill operation to raise beefsteak tomatoes. To support 20 acres of growing tomatoes, the landfill should be able to supply sufficient LFG for the peak heat load requirement. LFG produced by the landfill and typically flared, will be burned to produce hot water to heat the greenhouse and produce carbon dioxide system product gas that will be recycled back to the greenhouse plants to accelerate growth. Rain water will be collected and recycled.

The greenhouse is a hydroponic facility with computers controlling many aspects of the glass enclosed growing environment. Temperature, feeding and watering will be monitored and controlled constantly, with harmful pests controlled by the introduction of natural predators. The 200,000 tomato plants will produce approximately 50 pounds of tomatoes each, or about 10 million pounds per year. The landfill/greenhouse combination is located in an area favorable (i.e., temperature, humidity, sunlight, etc.) to greenhouse operation utilizing heating of the greenhouse with a first portion of the LFG and enhancing tomato plant growth with a second portion of the LFG after removal and/or burn-out of methane and other gases potentially harmful to plant growth. The system is designed for a hot water boiler plant 14 capable of 90 million BTU/H. The flow of $CO_2$ system product gas (CSPG) to the greenhouse is capable of 10,000 cubic feet per minute (cfm) with impurities of SOX<1 ppm, NOX<15 ppm, CO<5 ppm and VOC<1 ppm. The $CO_2$ content of the CSPG is approximately 5.5% $CO_2$, but can range between 5–13% $CO_2$.

As an alternative to using flare 86 for unused LFG, it is of course possible to maximize on-stream utilization of the LFG via steam generators/steam turbines as described in FIG. 2 or other energy utilization devices such as engines.

The system may be further optimized by configuring the thermal oxidizer 68 as a hot water heater to further supplement the heat supplied to greenhouse.

While there is described what is considered to be the preferred embodiment of the invention, other modifications will occur to those skilled in the art without departing from the inventive concept.

What is claimed is:

1. Method for enhancing the growth of plants in an environmentally controlled greenhouse located near a landfill site, comprising:

collecting landfill gas (LFG) from the landfill site and transporting the landfill gas to a distribution point near the landfill site, separating the landfill gas into at least a first LFG portion and a second LFG portion, combusting said first LFG portion of the landfill gas and heating the greenhouse with the products of combustion, providing a $CO_2$ system having adsorber beds, adsorbing the non-methane hydrocarbons (NMO) and reduced sulphur compounds (TRS) from said second portion of the LFG in the adsorber beds, combusting the second LFG portion so as to remove methane and any remaining NMO and generate a clean $CO_2$ system product gas (CSPG), conducting the CSPG to the greenhouse to provide carbon dioxide to the plants therein, and selectively controlling the temperature and the carbon dioxide level in the greenhouse so as to enhance plant growth therein.

2. Method according to claim 1, including the step of collecting a portion of the CSPG from the $CO_2$ system and regenerating said adsorber beds to remove NMO from the adsorber beds.

3. Method according to claim 2, wherein there are dual-connected adsorber beds, and including the step of regenerating one adsorber bed with CSPG while using the other adsorber bed in the adsorbing step.

4. Method for enhancing the growth of plants in an environmentally controlled greenhouse located near a landfill site, comprising:

providing a first combustion system located near the landfill site for heating the greenhouse, collecting landfill gas (LFG) from the landfill site and transporting the landfill gas to a distribution point near the landfill site, separating the landfill gas into at least a first LFG portion and a second LFG portion, distributing said first LFG portion of the landfill gas to the first combustion system, combusting the first LFG portion in the first combustion system and heating the greenhouse, providing a $CO_2$ system having adsorber beds and a second combustion system, distributing said second LFG portion of the landfill gas to the $CO_2$ system, adsorbing the non-methane hydrocarbons (NMO) and reduced sulphur compounds (TRS) from the second portion of the LFG in the adsorber beds, subjecting the second LFG portion to a controlled combustion in the second combustion system so as to remove methane and generate a clean $CO_2$ system product gas (CSPG), conducting the CSPG to the greenhouse enclosure, and selectively controlling the temperature and the carbon dioxide level in the greenhouse so as to enhance plant growth therein.

5. Method according to claim 4, including the step of collecting a portion of the CSPG from the $CO_2$ system and regenerating said adsorber beds to remove NMO from the adsorber beds.

6. Method according to claim 4, including providing a control system, a plurality of valve means, a plurality of pump means, a plurality of sensors measuring temperature and $CO_2$ levels in the greenhouse and selectively controlling the valve means and the pump means so as to control the temperature and the $CO_2$ level in the greenhouse.

7. Method for enhancing the growth of plants in an environmentally controlled greenhouse located near a landfill site, comprising:

providing a power generation system located near the landfill site, having a first combustion system for supplying heat energy to the power generation system and waste heat collection means for heating the greenhouse with products of combustion from the first combustion system, collecting landfill gas (LFG) from the landfill site and transporting the landfill gas to a distribution point near the landfill site, separating the landfill gas into at least a first LFG portion and a second LFG portion, distributing said first LFG portion of the landfill gas to the first combustion system, combusting the first LFG portion in the first combustion system and heating the greenhouse with the waste products of combustion, providing a $CO_2$ system having adsorber beds and a second combustion system, distributing said second LFG portion of the landfill gas to the $CO_2$ system, adsorbing the non-methane hydrocarbons (NMO) and reduced sulphur compounds (TRS) from the second portion of the LFG in the adsorber beds, subjecting the second LFG portion to a controlled combustion in the second combustion system so as to remove methane and generate a clean $CO_2$ system product gas (CSPG), conducting the CSPG to the greenhouse enclosure, and selectively controlling the temperature and the carbon dioxide level in the greenhouse so as to enhance plant growth therein.

8. Method according to claim 7, wherein the power generation system includes a steam generator and a steam turbine connected to an electric generator, and further including the step of heating the greenhouse with steam taken from the steam turbine.

9. Method according to claim 7, including the step of further heating the greenhouse with the products of combustion of the second LFG portion in the second combustion system.

* * * * *